April 9, 1968  C. H. KEITH ET AL  3,377,090
CONNECTION FOR RESILIENT DEFORMABLE PANELS
Filed Dec. 7, 1965                                2 Sheets-Sheet 1
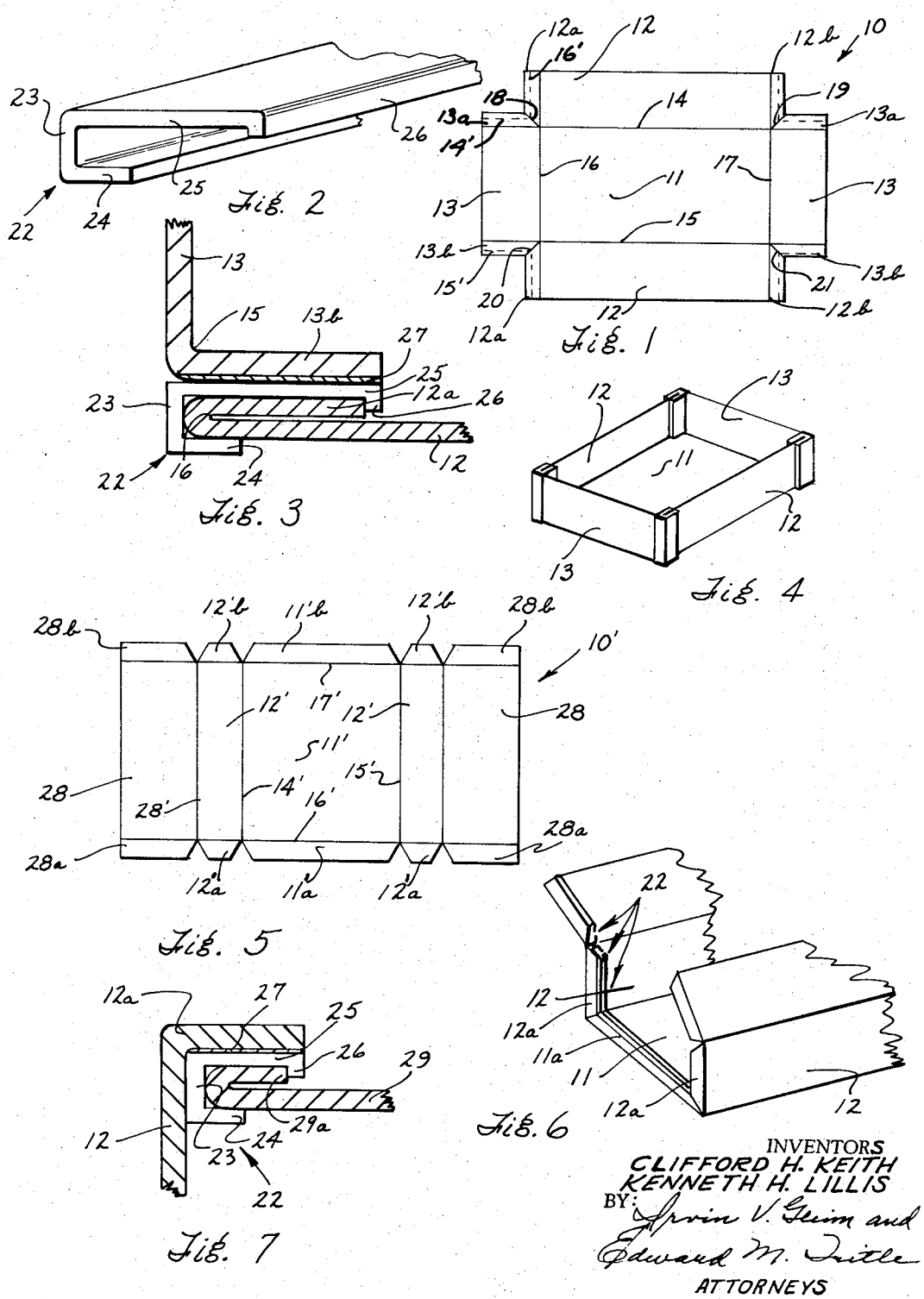
INVENTORS
CLIFFORD H. KEITH
KENNETH H. LILLIS
BY
ATTORNEYS United States Patent Office 3,377,090
Patented Apr. 9, 1968

3,377,090
CONNECTION FOR RESILIENT
DEFORMABLE PANELS
Clifford H. Keith and Kenneth H. Lillis, Cincinnati, Ohio, assignors to The Mead Corporation, Dayton, Ohio, a corporation of Ohio
Filed Dec. 7, 1965, Ser. No. 512,172
1 Claim. (Cl. 287—189.36)

ABSTRACT OF THE DISCLOSURE

In a joint connecting a pair of panels of resilient material each having a reverse folded flap edge portion, the connecting member includes a web with deformable members extending angularly from opposite sides of the web. An arcuate member extends from both sides of the web toward but terminates short of the deformable members. Each panel and its folded flap is retained between an end of the arcuate member and a deformable member and the flap edge portions is releasably engaged by a depending portion of the deformable member to prevent longitudinal displacement of the panel.

---

The present invention relates to securing means and, more particularly, to improved means for securing together adjacent panels of resilient deformable material such as paperboard, corrugated board, fibreboard and the like.

In general, the invention contemplates the provision of deformable resilient connecting means having a partial housing portion for readily receiving and readily detachably retaining therein a panel portion of such resilient deformable material, simultaneously providing desired rigidity as well as axial and transverse strength to a thus formed structural joint.

Service requirements, functional requirements and economical problems have imposed exceedingly difficult problems in the paperboard container industry. For example, there has existed for many years, and there continues to exist, a need for a container that is economical to manufacture and that is easy and economical to assemble. Additionally, such containers must withstand heavy loads. They must be sturdy and capable of withstanding rough handling and impact loads to which they are often subjected during normal handling and shipment. It is also highly desirable that such containers be provided with seams and/or joints that can be easily assembled together without requiring stitching and which will remain secured together when so assembled to avoid loss or damage to the contents thereof. Another difficult problem arises from the need for high stacking strength to resist excessive deformation and/or damage to the container and/or its contents because of high compressive loadings that result from the need for stacking of such loaded containers on top of one another. Steadily rising costs of materials and labor make these problems more difficult and the need for their successful solution more acute with the passing of time.

Although the need has long existed for a container possessing the above noted features, prior to the present invention there has been available only partial solutions to the problem although the prior art clearly indicates that much time and effort have been expended over an extensive time period in an attempt to seek a satisfactory solution. For example, partial solutions are revealed in Lacy Patent 2,993,637 (1961) and in Simon 663,134 (1900) wherein there are disclosed arrangements for connecting together panel members by means of metallic members which employ bolt-like piercing fingers or spurs as a securing means. Similarly, Fellowes Patent 2,206,084 (1940) and Hall 959,734 (1910) show similar constructions wherein the panel members are secured by squeezing or partial piercing. Provision of strength and rigidity in certain arrangements are exemplified in Atkinson 277,401 (1883) wherein box elements and joining elements, both of metal, are united by crimping; in Doody 1,478,325 (1923) wherein removable metal end frames are employed; and in structures wherein the individual elements are essentially non-deformable and rigid, as in McClure 1,129,040 (1915) and in Comstock 254,115 (1882). In certain instances not requiring great strength or rigidity, and where materials of the type often referred to as plastics can be employed, extruded plastic shapes have been disclosed as a securing means, sometimes welded by means of heat or solvent action and sometimes snapped together, in the toy field or in areas of items employed by interior decorators such as miniature buildings or furniture, lampshades, etc., as exemplified in Slaughter 2,388,297 (1945). As noted heretofore, to the extent that the prior art is pertinent, it furnishes at most only a partial solution and even then is subject to certain limitations and disadvantages. Accordingly, the above noted prior art is thus exemplary of the problems and disadvantages and over which the present meritorious and useful invention is a novel and unobvious improvement.

Accordingly, it is an object of the present invention to provide means for obviating the above problems and difficulties.

Another object is to provide improved connecting means.

A further object is to provide improved connecting means and simultaneously to provide axial and transverse strength to a structural joint in which such improved connecting means is employed.

Another object is to provide an improved connecting means that is economical to manufacture, is easily assembled and disassembled and which provides positive locking during normal handling and shipment.

Still another object of the invention is to provide an improved means for connecting together adjacent panels of deformable resilient material which means is economical to manufacture, is of simple construction and easily assembled and disassembled, provides a positive lock type of connection and is cooperatively associated with the panels to simultaneously perform the additional dual functions of providing strength and rigidity to a joint connected by such means and also functions as a spacing means to provide air cells of a pre-determined size between the outer surfaces of adjacent panels.

Other objects and advantages will become apparent from the following description taken in conjunction with the accompanying drawings, in which:

FIGURE 1 is a plan view illustrating a blank for a container embodying the invention;

FIGURE 2 is a perspective view, partly broken away, illustrating a connecting device in accordance with one embodiment of the invention;

FIGURE 3 is a cross-sectional view, partly broken away, showing the manner of connecting together adjacent panels of the blank of FIGURE 1 utilizing the embodiment of FIGURE 2;

FIGURE 4 is a perspective view showing an assembled container in accordance with the embodiments of FIGURES 1–3;

FIGURE 5 is a plan view illustrating a blank for a container utilizing a modified embodiment;

FIGURE 6 is a perspective view, partly broken away, showing the container of FIGURE 5 in a partly assembled condition;

FIGURE 7 is a cross-sectional view, partly broken away, illustrating the manner in which the side panels are connected to the end panel in the container illustrated in FIGURE 6;

Figure 8:
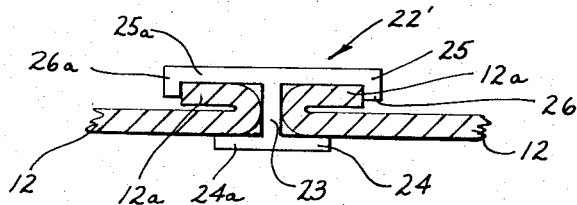
FIGURE 8 is a perspective view, partly broken away, illustrating another embodiment of the invention wherein adjacent end portions of two panels are connected together.

Referring to the drawings, particularly FIGURES 1-4, a blank of material such as paperboard, corrugated board, fiberboard and the like from which a container may be formed is indicated generally at 10. Blank 10 includes a bottom portion 11, side portions 12 and end portions 13. Opposed side portions 12 are separated by and are foldably connected to bottom portion 11 along fold lines 14, 15. Similarly, opposed end portions 13 are separated by and foldably connected to bottom portion 11 along fold lines 16, 17. At the opposite ends of side panels 12 and foldably connected thereto along fold lines 16, 17 and flap portions 12a, 12b, respectively. Flap portions 13a, 13b are similarly disposed and foldably connected to end portions 13 along fold lines 14, 15, respectively. Flap portions 12a and 13a, portions 12b and 13a, portions 13b and 12a, and portions 13b and 12b are separated, respectively, by cut lines 18, 19, 20, 21 which extend diagonally outwardly from the respective intersections of lines 14 and 16, 14 and 17, 15 and 16, and 15 and 17.

From the viewpoint of economy in shipping and in storage as well as convenience of a user, it is desirable to provide means whereby container blanks, as described above, can be shipped and stored in a flat condition until ready for use and at that time can be easily and readily erected and assembled for use. This is accomplished in accordance with the invention by the provision of novel and improved securing means which conveniently may be of plastic material of suitable shape, described more particularly hereinafter, and of suitable lengths that are easily stored until ready for use and then are easily cut to desired lengths for use in the assembly and securing together of portions of containers and which avoids piercing or puncturing of container blank portions as well as the necessity for the use of expensive and space-consuming stitching or other special equipment. Since manufacturing floor space is extremely valuable, it is important to eliminate, as much as possible, anything that is not absolutely essential to manufacturing operations.

As is best illustrated in FIGURES 2, 3, the improved securing means is indicated generally at 22. Securing means 22 comprises a central or web portion 23 having depending therefrom and at opposite ends thereof, laterally extending members 24, 25. For reasons that will become apparent as the description proceeds, member 25 has a length substantially greater than that of member 24 and, additionally, is provided with a depending portion 26.

The assembly and erection of a container will now be described with reference to a single corner assembly, the lower left hand corner of the blank of FIGURE 1, and it will be readily apparent that all other corner assemblies are made and erected in a similar manner. Side portions 12 are folded upwardly along lines 14, 15. Similarly, end portions 13 are folded upwardly along lines 16, 17. Flap portions 12a, 12b are reverse folded inwardly as best shown in FIGURE 3. Flap portions 13a, 13b are folded inwardly and the outer surface thereof is secured to the outer surface of member 25 of securing means 22, the length of which conforms generally with that of flap portions 13a, 13b, respectively. Conveniently, flap portion 13b and securing means 22 may be secured together as illustrated in FIGURE 3 by adhesive material 27 applied either automatically by machine or by hand and either to the surface of flap 13b or to member 25 whichever may be more convenient, or, if desired, staples or rivets may be employed. Erection and securing of a corner joint of an assembled container is then accomplished by merely inserting side portion 12 and its reversely folded flap portion 12a, in the manner illustrated in FIGURE 3, into the receiving and retaining housing provided by the cooperative association of members 24, 25 and web 23 together with depending portion 26.

Neither the material nor the dimensions of securing means 22 are critical but nevertheless are subject to certain general limitations, a proper understanding of which will insure its functioning and operation as intended in accordance with the invention. Of course, the properties of the material of the securing means should be such that can easily and inexpensively be formed to a desired shape. In addition, it should be dimensionally stable after forming. It should possess what may be described as semi-rigid characteristics in the sense that it resists deformation in certain areas and directions and yet is readily deformable in other areas and directions. Furthermore, it should possess resiliency characteristics and thus will return from a deformed condition to its original condition upon removal of the load that causes deformation. Considering the left hand portion of securing means 22 as shown in FIGURES 2, 3, web 23, member 24, and that portion of member 25 that is coextensive with member 24 constitute a unitary structure that provides high compressive strength with respect to loads that may be applied along the longitudinal extent thereof and thus provides great stacking strength. Additionally, said unitary structure provides rigidity and is highly resistant to bending due to the application of loads that may be applied thereto in a direction transverse to the longitudinal extent thereof, that is, either vertically or horizontally in FIGURE 3.

As noted heretofore, the length of member 25 is substantially greater than that of member 24. Hence, the free end (right hand) of member 24 is relatively stiff and resistant to deformation in a vertical direction in FIGURE 3, whereas the right hand end of member 25 is relatively easier to deform in a vertical direction, thus enabling and facilitating insertion and/or removal of side portion 12 and its reversely folded flap portion 12a into or from the position illustrated in FIGURE 3. Also, the spacing between web 23 and depending portion 26 is chosen to correspond with the width of flap portion 12a from fold line 16 to the free edge thereof plus the thickness of the material (between fold line 16 and web 23) so that, following insertion of side portion 12 and reversely folded flap portion 12a, depending portion 26 engages the free edge of flap portion 12a and secures it and side portion 12 against web 23 when member 25 is in its normal and non-deformed position. Thus, while the length of member 25 is made substantially greater than the length of member 24 to enable and facilitate insertion and/or removal during assembly and/or disassembly, the length of member 25 and also the width of the flap portion should not be so great as to result in excessive flexibility of the free end of member 25 in order to avoid accidental disengagement of depending portion 26 with the free edge of the flap portion.

In addition to the securing forces that result from the action of web 23 and depending portion 26, supplemental securing forces may be employed, if desired, by choosing the length of web 23 so that the spacing between member 24 and member 25 is somewhat less than the combined thickness of side portion 12 and its associated reversely folded flap portion. The resilient properties of a deformable material such as corrugated board, paperboard, fibreboard and the like are such that when the reversely folded side portion and flap portion are inserted into said lesser spacing between members 24, 25, the squeezing action exerted thereby is opposed by the resiliency of the material, thus resulting in strong frictional forces being exerted between members 24, 25 and side portion 12 and flap portion 12a to resist the removal of said portions following their insertion. Furthermore, as will be evident from FIGURES 3, 4, the thickness of the walls of securing means 22 and its disposition at the corners of an assembled container provides an air cell of predetermined size between the outer walls of containers when stacked in end-to-end or in side-by-side relationship thereby affording additional protection against damage to the contents thereof.

In the embodiment of FIGURES 5–7, a slightly modified container and blank are shown and like numerals designate like elements. The principal differences are in the provision of separate end panels for the container and a modification of the connection between the end panels of the container and the side panels thereof. Thus, 11' and 112' are bottom portions and bottom flap portions of container blank 10', flap portions 11a' and 11b' being foldably connected to bottom portion 11' along fold lines 16', 17' and side portions 12' being foldably connected to the bottom portion along fold lines 14', 15'. Cover portions 28 are similarly foldably connected to side portions 12' along fold lines 28' and have flap portions 28a and 28b foldably connected thereto along fold lines 16' and 17'. In this embodiment, end panels 29 are separate from container blank 10' and have reversely folded flap portions 29a at the outer periphery of end panel 29. Panels 29 and their reversely folded flap portions 29a are inserted into and secured by securing means 22 similarly to the manner described in the previously described embodiment but differing in that the securing means is connected to the inner rather than the outer surface of side panel flap portions 12a as illustrated in FIGURE 7.

In the embodiment of FIGURE 8, the securing means, in addition to web 23, members 24, 25 and depending portion 26, is additionally provided with oppositely disposed members 24a, 25a and portion 26a. Thus, securing means 22' of FIGURE 8 readily detachably secures together two adjacent aligned panel portions 12, each having a reversely folded flap portion 12a, in substantially the same manner described above in connection with FIGURE 3 except that securing means 22' is not connected to anything except panels 12 and flap portions 12a.

Figure 9:
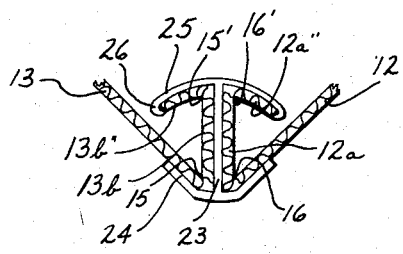
FIGURE 9 is a cross-sectional view, partly broken, illustrating another modified embodiment.

In the embodiment illustrated in FIGURE 9, securing means is similar to that of FIGURE 8 but differs in that it is intended to connect adjacent panel portions 12, 13 that are angularly disposed rather than in substantial alignment, as at the corner of a container. In FIGURE 9, members 24 are oppositely and angularly disposed relative to web 23. Similarly, members 25 and depending portions 26 are angularly disposed relative to web 23 and, if desired, members 25 may be arcuate in shape. Panel portions 12, 13 have reversely folded flap portions 12a and 13b, as in the previously described embodiments and, additionally, have a second reversely folded flap portion 12a'' and 13b'', respectively. As in the previous embodiments, the flap portions are inserted into the retaining housing formed by cooperative association of web 23 and members 24, 25 by deforming reversely folded flap portions 12a, 13b and/or members 24, 25 and making a lateral insertion. Alternatively, the securing means may be pushed longitudinally over the reversely folded flap portions disposed as shown in FIGURE 9 following their insertions at the open end of the securing means. Although the last described manner of insertion is possible, it is not necessary and, ordinarily, it will be easier to insert the flaps laterally. After insertion of the flap portions has been achieved, depending portions 26 engage the free ends of flap portions 12a'', 13b'' thus holding these portions securely against the surfaces of members 25 and web 23 and simultaneously force panel portions 12, 13 and flap portions 12a, 13b into the seats formed between web 23 and angularly disposed members 24.

Figure 10:
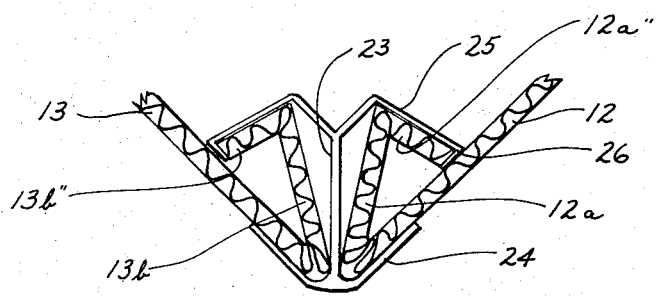
FIGURE 10 is a cross-sectional view, partly broken, illustrating a further modified embodiment; and, FIGURE 11 is a cross-sectional view illustrating still another embodiment.

In FIGURE 10, the embodiment shown is substantially identical with that of FIGURE 9 but differs mainly in the extent of members 25 and flap portions 12a'', 13b''. In this figure, members 25 extend far enough from web 23 to insure that panel portions 12, 13 are placed and maintained with their outer surfaces in contact with the inner surfaces of members 24. Additionally, flap portions 12a'', 13b'' are extended so that they, together with flap portions 12a, 13b and the adjacent portions of panel portions 12, 13 form triangularly shaped sections, thus providing additional strength and stiffness.

Figure 11:
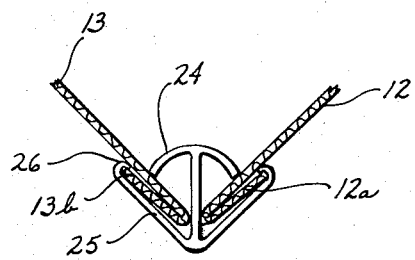

In FIGURE 11, there is shown a further modification of the securing means of FIGURE 8. This modification differs primarily in that members 25 are angularly disposed relative to web 23 and members 24, which may be of arcuate or other desirable shape, e.g., straight as in FIGURE 8, bridge the space between the inner surfaces of panel portions 12, 13 and urges these panel portions into engagement with the inner walls of members 25.

While particular embodiments of the invention have been illustrated and described, it will be obvious to those skilled in the art that various changes and modifications may be made without departing from the invention and it is intended in the appended claim to cover all such changes and modifications that fall within the true spirit and scope of the invention.

What is claimed is:

1. A connecting joint comprising in combination angularly disposed
    first and second compressible panel portions of resilient material each having
        a flap portion extending generally parallel to its associated panel portion and having
            a free edge and reversely foldably connected to its associated panel portion along a fold line, and
    means readily detachably connecting said panel portions together said means including
        a web portion having first and second oppositely disposed ends, a pair of resiliently deformable straight members each connected to said first end and extending outwardly at an acute angle away from opposite sides of said web portion, said members each having a depending portion spaced from and extending toward said web portion in engagement with one of said free edges, and an arcuate member connected to said second end with its concave surface facing said first end and extending outwardly from both sides of said web portion with each terminal portion of said arcuate member engaging one of said panel portions and disposed substantially perpendicular thereto at said point of engagement, and with each said reversely folded flap portion releasably engaged by one of said deformable members and its depending portion.

References Cited

UNITED STATES PATENTS

| | | | |
|---|---|---|---|
| 2,175,605 | 10/1939 | Holub | 287—189.36 |
| 2,189,159 | 2/1940 | Anshicks | 287—189.36 X |
| 2,259,382 | 10/1941 | Ingels | 287—189.36 |
| 2,364,083 | 12/1944 | Lindsay | 287—189.36 X |
| 2,388,297 | 11/1945 | Slaughter | 287—189.36 X |
| 2,828,046 | 3/1958 | Weinman | 287—189.36 X |

EDWARD C. ALLEN, *Primary Examiner.*